UNITED STATES PATENT OFFICE.

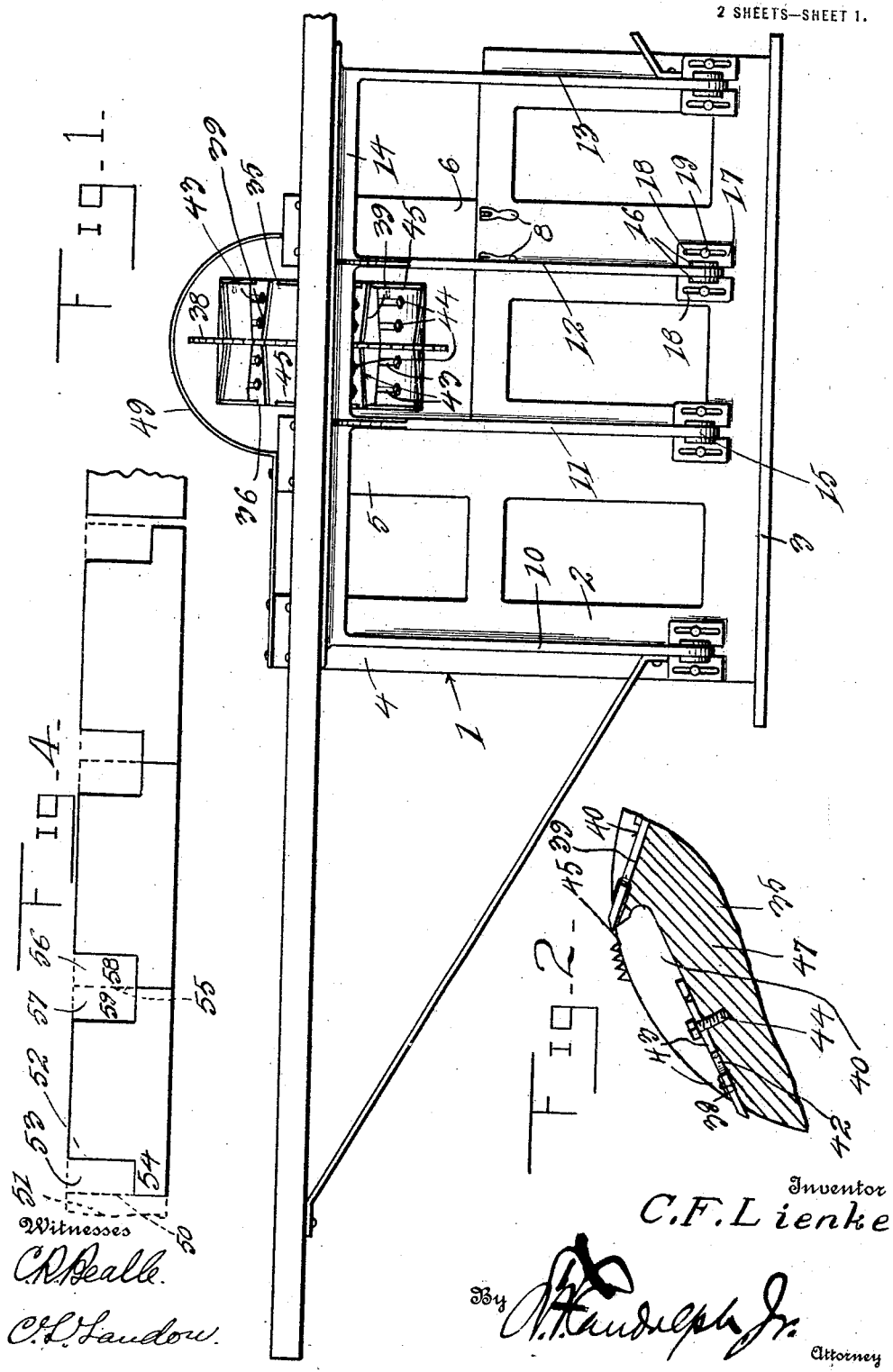

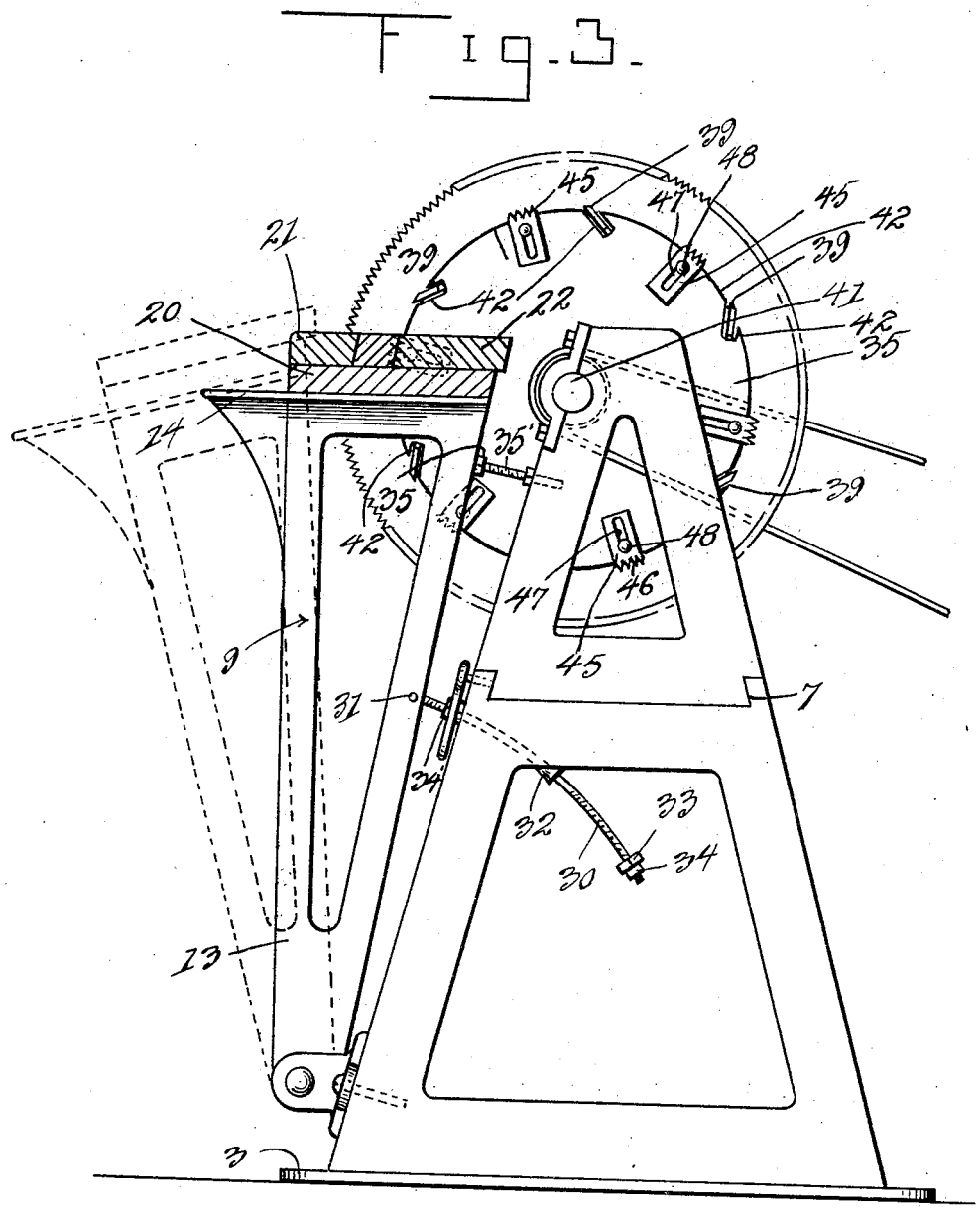

CARL F. LIENKE, OF MINNEAPOLIS, MINNESOTA.

DADOING-MACHINE.

1,298,065.

Specification of Letters Patent.   Patented Mar. 25, 1919.

Application filed October 7, 1913.   Serial No. 793,871.

*To all whom it may concern:*

Be it known that I, CARL F. LIENKE, a citizen of the United States, residing at Minneapolis, in the county of Hennepin and State of Minnesota, have invented certain new and useful Improvements in Dadoing-Machines; and I do hereby declare the following to be a full, clear, and exact description of the invention, such as will enable others skilled in the art to which it appertains to make and use the same.

This invention relates to new and useful improvements in dadoing machines, and has particular reference to that type of such machines employed in preparing window sills from dressed stock.

An object of this invention is to provide a machine which will permit the operator to run the rough stock through the molding machine in whole lengths instead of cutting it up into sill lengths prior to the planing. This invention contemplates the provision of a dadoing machine embodying a novel type of dado head so constructed that the dressed planks after being taken from the molding machine may be run longitudinally into the dadoing mechanism and will then be cut and notched with the same ease and rapidity which characterizes the operation of a swing saw.

An object of equal importance with the foregoing is to construct the dado heads of the machine of this invention in such manner that they may be quickly detached from the saw arbor and replaced by collars, so that the circular saw may be employed in the usual manner as a cut off saw.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts:

Figure 1 is a front elevation of the dadoing machine of this invention with the various elements in operative and assembled relation.

Fig. 2 is a sectional view illustrating in detail the manner in which the cutter knives are secured to the dado heads.

Fig. 3 is an end elevation partly in section of the machine.

Fig. 4 is a detail view illustrating a sill plank which has been put through the machine of this invention, illustrating the manner in which the various cutting elements operate to simultaneously cut through and notch the sills.

Referring to the drawings in detail, the bench supporting frame, designated as an entirety in Fig. 1 by the numeral 1, includes a frame body 2, formed integrally with the body plate 3 and a pair of fixed or stationary bearing standards 4 and 5 and an adjustable bearing standard 6. The adjustable bearing standard 6 is dove-tailed at its base portion, as indicated at 7, in Fig. 3, and is designed to be adjusted longitudinally on the main frame body 2. A pair of lock screws 8 are provided for the obvious purpose of clamping the member 6 in adjusted position.

The swinging work table designated generally by the numeral 9 includes frame members 10, 11, 12 and 13, which are formed integrally with the table plate 14, and are pivotally mounted, as at 15, between ears 16, formed integrally with and extending laterally from hinge plates 17. The hinge plates 17 are formed with a pair of vertically extending parallel slots 18, in which set screws 19, which are threaded into the frame body 2, are arranged.

On the top plate 14 is arranged a table slab 20, which may be bolted or otherwise secured to the member 14, and is equipped on its upper face with a stop rail 21, which is arranged to push the stock indicated at 22 through the cutting element of the dado head.

In order to limit the outward swinging of the frame 9 when the slab 20 is withdrawn from the vicinity of the dado head, there is preferably provided an arcuate stop rod 30, which is pivotally connected at one terminal, as at 31, to the frame 9, and is mounted for sliding movement through a bore formed in the frame body 2. A stop spur 32 is formed on the frame body 2, as illustrated in Fig. 3, and is designed to limit the sliding movement of the rod 30 by engagement with a rubber or fiber collar 33, which is loosely mounted on the rod and is held against displacement therefrom by a bur 34, which is threaded on the rod. It will be readily observed that by adjustment of the bur 34, the distance which the frame 9 may swing may be quickly varied.

A nut 34' is also threaded on the rod 30 and operates between the frames 9 and 2, to engage the frame 2 when the frame 9 is swung toward the frame 2 and limit the movement of the frame 9.

A screw threaded bar 35' adjustably mounted within the bearing standard 6, extends outwardly therefrom and is provided with a head 35" for engagement with the frame 9 to limit its movement toward the table.

The improved dado head of this invention includes two drum heads, designated by the numerals 35 and 36. These dado drum heads are formed, as will be hereinafter described, to receive the scoring-spurs and cutter knives employed in notching the sills during the operation necessary to the production of the sill lugs. The drum heads are mounted in the usual manner on a saw arbor and are detachable therefrom. In practice a circular saw 38 is mounted on the saw arbor between the adjacent faces of the drum heads 35 and 36. This saw 38 is of sufficient diameter to cut through the sill plank in advance of the scoring-spurs and cutter knives.

The cutter knives 39 are detachably secured to each dado head, and are in each instance preferably six in number, as will be observed by reference to Fig. 3, and are adjustably mounted in cut out portions or recesses 40 formed in the drum heads. These recesses 40 are, of course, six in number in the preferred form and are formed in the nature of chords of a circle, of which the spindle 41 is a center. These cutter knives 39 are slightly inclined and convex at their terminals, and are arranged with their cutting terminals projecting a slight distance beyond the edges of the recesses 40. The outer terminals of the knives adjacent the cutting edges are increased in width and received within slots 42 formed in the outside walls of the recesses 40.

Each of the cutter knives 39 is bifurcated at its rear and relatively narrow terminal by longitudinally extending slots 43, through which the bolts 44 extend and have threaded engagements with the dado heads as will be observed by reference to Fig. 2.

It will, of course, be apparent that the application of the screw or bolt 44 will produce a clamping of the rear portion of the cutter blades between the screws and the outer face of the recesses 40.

It is also apparent by this construction that the cutter knives may be readily adjusted to allow the desired portion of the cutting edges to project beyond the periphery of the drum head, thus making it possible for the operator to allow for the various size cutting edges necessary in working up soft or hard wood stock.

The scoring-spurs 45 are six in number, and are detachably secured in recesses formed in each drum head so as to permit the cutting edges of the spurs 45 to be disposed in the plane of the outer ends of the cutting edges of the knives 39. The spurs 45 are arranged slightly in advance of the cutting edges of the cutter knives, as will be readily observed by reference to Fig. 3. Each scoring-spur is preferably formed of a substantially rectangular steel plate and provided with the cutting teeth 46, and is formed with a longitudinally extending slot 47, in which the securing screw or bolt 48, which is threaded into the drum head, is mounted. It will be apparent that by adjustment of the securing member 48, the scoring-spurs 45 may be readily adjusted to project the cutting teeth 46 any desired distance beyond the periphery of the drum heads.

Relative to the arrangement of the cutter knives, it is desirable to emphasize the fact that in practice the cutting edges of the knives are formed to extend at an angle to each other and are divergent in the direction of the saw 38. By thus forming the cutting edges, it is possible to obtain a shear cut through the material, and the liability of splintering or jagging of the stock is greatly reduced, since the various points of the cutting edges will be presented to the stock individually and not simultaneously.

In most planing and sawing mills it is customary to equip the various machines with dust collecting hoods which are communicant with a common suction pipe by an individual dust conducting pipe. Therefore, in order to construct this machine in accordance with the usual requirements, there has been provided a dust hood 49, which may be attached to the fixed bearing standards 4 and 5 and arranged to incase the dado head, except at the point where the sill planks are applied, during the operation of the machine. The dust hood 49 may be equipped with the dust conducting pipe, which may be attached in the usual manner to the suction or forced draft pipe.

Briefly the operation is as follows: After the sill plank has been run through the molding or planing machine and dressed, it is placed on the slab 20, presuming, of course, in this connection that the operator has swung the frame 9 away from the dado head. Reference will now be had more particularly to Fig. 4, in which there has been illustrated in detail a sill plank which has been run through the dadoing machine of this invention. In sawing the first sill from the plank, the first operation is to push the work table toward the dado head in such manner that the saw 38 will square the sill, as on the line 50 in Fig. 4, cutting off the rough cut end 51. Simultaneously with the cutting of the cross kerf 50 by the saw 38, the scoring-spurs 45, working in advance of the cutter knives, make the partial cross kerf 52, and the cutter knives 39 cut away the portion 53. It will thus be apparent that one movement of the work table to the dado head operates to simultaneously square the end of the sill by a cross kerf, and to produce the notch necessary to the forming of the sill lug 54. Following this operation, the plank is advanced along the work table to bring the saw 38 at the point indicating the desired length of the sill. The operator then again swings the work table into the dado head, and the saw 38 cuts the cross kerf 55, and the knives 39 and scoring spurs 45 of the dado heads 35 and 36, respectively, produce the notches 56 and 57, forming the desired sill lugs 58 and 59. From the foregoing it will be apparent that one movement of the work table into the dado head in this instance acts to simultaneously notch and cross-cut the sill plank into the desired lengths, and eliminates the necessity of squaring each end of the separate sills.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:

In a dadoing machine, a spindle, a circular saw mounted upon said spindle, a pair of drums of less external diameter than said saw mounted upon opposite sides of said saw and in engagement therewith, the circumferential surfaces of said drums having spaced recesses therein and the portions of the outer walls of the recesses adjacent the periphery of the drums having slots therein, said drums having recesses in the opposed end faces thereof arranged between the first mentioned recesses, adjustable knives confined between the circular saw and the outer walls of the recesses, the outer cutting ends of the knives being increased in width and extended within the slots, and a plurality of scoring spurs adjustably secured to the last mentioned recesses having cutting edges disposed in the plane of the adjacent terminals of the cutting edges of the knives.

In testimony whereof I affix my signature in presence of two witnesses.

CARL F. LIENKE.

Witnesses:
  Louis L. Schartz,
  E. E. Harding.

Copies of this patent may be obtained for five cents each, by addressing the "Commissioner of Patents, Washington, D. C."